US008665333B1

(12) United States Patent
Sharma et al.

(10) Patent No.: US 8,665,333 B1
(45) Date of Patent: Mar. 4, 2014

(54) METHOD AND SYSTEM FOR OPTIMIZING THE OBSERVATION AND ANNOTATION OF COMPLEX HUMAN BEHAVIOR FROM VIDEO SOURCES

(75) Inventors: Rajeev Sharma, State College, PA (US); Satish Mummareddy, Washington, DC (US); Emilio Schapira, Washington, DC (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1580 days.

(21) Appl. No.: 12/011,385

(22) Filed: Jan. 25, 2008

Related U.S. Application Data

(60) Provisional application No. 60/898,311, filed on Jan. 30, 2007.

(51) Int. Cl.
*H04N 7/18* (2006.01)

(52) U.S. Cl.
USPC ........... 348/159; 348/135; 348/139; 348/143; 348/169

(58) Field of Classification Search
USPC ............. 348/47–48, 135, 139, 143, 153, 155, 348/159, 169
See application file for complete search history.

(56) References Cited

U.S. PATENT DOCUMENTS

| | | | |
|---|---|---|---|
| 5,600,368 A * | 2/1997 | Matthews, III | 348/143 |
| 5,745,036 A * | 4/1998 | Clare | 340/572.1 |
| 6,430,357 B1 * | 8/2002 | Orr | 386/244 |
| 6,531,963 B1 * | 3/2003 | Nyfelt | 340/573.1 |
| 6,597,391 B2 * | 7/2003 | Hudson | 348/153 |
| 6,741,973 B1 | 5/2004 | Dove et al. | |
| 6,990,217 B1 * | 1/2006 | Moghaddam et al. | 382/118 |
| 7,006,982 B2 | 2/2006 | Sorensen | |
| 7,536,706 B1 * | 5/2009 | Sezan et al. | 725/113 |
| 7,623,755 B2 * | 11/2009 | Kuspa | 386/282 |

(Continued)

FOREIGN PATENT DOCUMENTS

WO    WO 2006/106496    * 10/2006    ............... H04N 7/18

OTHER PUBLICATIONS

U.S. Appl. No. 60/808,283, Sharma, et al.
U.S. Appl. No. 60/846,014, Sharma, et al.

*Primary Examiner* — David Lazaro
*Assistant Examiner* — Sarah Drabik

(57) ABSTRACT

The present invention is a method and system for optimizing the observation and annotation of complex human behavior from video sources by automatically detecting predefined events based on the behavior of people in a first video stream from a first means for capturing images in a physical space, accessing a synchronized second video stream from a second means for capturing images that are positioned to observe the people more closely using the timestamps associated with the detected events from the first video stream, and enabling an annotator to annotate each of the events with more labels using a tool. The present invention captures a plurality of input images of the persons by a plurality of means for capturing images and processes the plurality of input images in order to detect the predefined events based on the behavior in an exemplary embodiment. The processes are based on a novel usage of a plurality of computer vision technologies to analyze the human behavior from the plurality of input images. The physical space may be a retail space, and the people may be customers in the retail space.

20 Claims, 8 Drawing Sheets

(56) References Cited

U.S. PATENT DOCUMENTS

| | | | |
|---|---|---|---|
| 7,796,162 B2 * | 9/2010 | Ortiz | 348/211.8 |
| 8,295,597 B1 * | 10/2012 | Sharma et al. | 382/173 |
| 2001/0049826 A1 * | 12/2001 | Wilf | 725/120 |
| 2002/0085092 A1 | 7/2002 | Choi et al. | |
| 2002/0161804 A1 * | 10/2002 | Chiu et al. | 707/530 |
| 2002/0178085 A1 * | 11/2002 | Sorensen | 705/26 |
| 2003/0002712 A1 * | 1/2003 | Steenburgh et al. | 382/103 |
| 2003/0053659 A1 * | 3/2003 | Pavlidis et al. | 382/103 |
| 2003/0058339 A1 | 3/2003 | Trajkovic et al. | |
| 2003/0108223 A1 * | 6/2003 | Prokoski | 382/115 |
| 2003/0110038 A1 | 6/2003 | Sharma et al. | |
| 2004/0032495 A1 * | 2/2004 | Ortiz | 348/157 |
| 2004/0078809 A1 * | 4/2004 | Drazin | 725/34 |
| 2004/0113933 A1 | 6/2004 | Guler | |
| 2004/0120581 A1 | 6/2004 | Ozer et al. | |
| 2004/0131254 A1 * | 7/2004 | Liang et al. | 382/181 |
| 2004/0161133 A1 * | 8/2004 | Elazar et al. | 382/115 |
| 2005/0286774 A1 | 12/2005 | Porikli | |
| 2006/0010028 A1 * | 1/2006 | Sorensen | 705/10 |
| 2006/0010030 A1 * | 1/2006 | Sorensen | 705/10 |
| 2006/0023073 A1 * | 2/2006 | Li et al. | 348/211.99 |
| 2006/0047674 A1 * | 3/2006 | Visharam et al. | 707/101 |
| 2006/0053342 A1 | 3/2006 | Bazakos | |
| 2006/0239645 A1 * | 10/2006 | Curtner et al. | 386/95 |
| 2007/0055563 A1 * | 3/2007 | Godsey et al. | 705/10 |
| 2007/0208263 A1 * | 9/2007 | John et al. | 600/509 |
| 2007/0250901 A1 * | 10/2007 | McIntire et al. | 725/146 |
| 2010/0002082 A1 * | 1/2010 | Buehler et al. | 348/159 |
| 2011/0261172 A1 * | 10/2011 | Terry | 348/51 |

\* cited by examiner

METHOD AND SYSTEM FOR OPTIMIZING THE OBSERVATION AND ANNOTATION OF COMPLEX HUMAN BEHAVIOR FROM VIDEO SOURCES

CROSS-REFERENCE TO RELATED APPLICATIONS

This application claims the benefit of U.S. Provisional Patent Application No. 60/898,311, filed Jan. 30, 2007.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for automatically detecting predefined events based on the behavior of people in a first video stream from a first means for capturing images in a physical space, accessing a synchronized second video stream from a second means for capturing images that are positioned to observe the people more closely using the timestamps associated with the detected events from the first video stream, and enabling an annotator to annotate each of the events with more labels using an annotation tool.

2. Background of the Invention

Event Detection based on Shoppers' Behavior Analysis

There have been earlier attempts for event detection based on customers' behaviors in a video.

U.S. Pat. Appl. Pub. No. 2003/0058339 of Trajkovic, et al. (hereinafter Trajkovic) disclosed a method for detecting an event through repetitive patterns of human behavior. Trajkovic learned multi-dimensional feature data from the repetitive patterns of human behavior and computed a probability density function (PDF) from the data. Then, a method for the PDF analysis, such as Gaussian or clustering techniques, was used to identify the repetitive patterns of behavior and unusual behavior through the variance of the Gaussian distribution or cluster.

Although Trajkovic can model a repetitive behavior through the PDF analysis, Trajkovic are clearly foreign to the event detection for the aggregate of non-repetitive behaviors, such as the shopper traffic in a physical space. Trajkovic did not disclose the challenges in the event detection based on customers' behaviors in a video in a retail environment, such as the non-repetitive behaviors. Therefore, Trajkovic are clearly foreign to the challenges that can be found in a retail environment.

U.S. Pat. Appl. Pub. No. 2006/0053342 of Bazakos, et al. (hereinafter Bazakos) disclosed a method for unsupervised learning of events in a video. Bazakos disclosed a method of creating a feature vector of a related object in a video by grouping clusters of points together within a feature space and storing the feature vector in an event library. Then, the behavioral analysis engine in Bazakos determined whether an event had occurred by comparing features contained within a feature vector in a specific instance against the feature vectors in the event library. Bazakos are primarily related to surveillance, rather than event detection based on customers' behaviors in a video.

U.S. Pat. Appl. Pub. No. 2005/0286774 of Porikli disclosed a method for event detection in a video using approximate estimates of the aggregated affinity matrix and clustering and scoring of the matrix. Porikli constructed the affinity matrix based on a set of frame-based and object-based statistical features, such as trajectories, histograms, and Hidden Markov Models of feature speed, orientation, location, size, and aspect ratio, extracted from the video.

Shoppers' Behavior Analysis

There have been earlier attempts for understanding customers' shopping behaviors captured in a video in a targeted environment, such as in a retail store, using cameras.

U.S. Pat. Appl. Pub. No. 2006/0010028 of Sorensen (hereinafter Sorensen 1) disclosed a method for tracking shopper movements and behavior in a shopping environment using a video. In Sorensen 1, a user indicated a series of screen locations in a display at which the shopper appeared in the video, and the series of screen locations were translated to store map coordinates.

The step of receiving the user input via input devices, such as a pointing device or keyboard, makes Sorensen 1 inefficient for handling a large amount of video data in a large shopping environment with a relatively complicated store layout, especially over a long period of time. The manual input by a human operator/user cannot efficiently track all of the shoppers in such cases, partially due to the possibility of human errors caused by tiredness and boredom. The manual input approach is also much less scalable as the number of shopping environments to handle for the behavior analysis increases. Therefore, an automated event detection approach is needed. The present invention utilizes an automated event detection approach for detecting predefined events from the customers' shopping interaction in a physical space.

Although U.S. Pat. Appl. Pub. No. 2002/0178085 of Sorensen, now U.S. Pat. No. 7,006,982, (hereinafter Sorensen 2) disclosed a usage of a tracking device and store sensors in a plurality of tracking systems primarily based on the wireless technology, such as the RFID, Sorensen 2 is clearly foreign to the concept of applying computer vision based tracking algorithms to the field of understanding customers' shopping behaviors and movements. In Sorensen 2, each transmitter was typically attached to a hand-held or push-type cart. Therefore, Sorensen 2 cannot distinguish the behaviors of multiple shoppers using one cart from the behavior of a single shopper also using one cart. Although Sorensen 2 disclosed that the transmitter may be attached directly to a shopper, via a clip or other form of customer surrogate in order to correctly track the shopper in the case when the person is shopping without a cart, this will not be practical due to the additionally introduced cumbersome step to the shopper, not to mention the inefficiency of managing the transmitter for each individual shopper.

The present invention can embrace any type of automatic wireless sensors for the detection of the predefined events. However, in a preferred embodiment, the present invention primarily utilizes the computer vision based automated approach for the detection of the predefined events. The computer vision based event detection helps the present invention to overcome the obstacles mentioned above.

With regard to the temporal behavior of customers, U.S. Pat. Appl. Pub. No. 2003/0002712 of Steenburgh, et al. (hereinafter Steenburgh) disclosed a relevant exemplary prior art. Steenburgh disclosed a method for measuring dwell time of an object, particularly a customer in a retail store, which enters and exits an environment, by tracking the object and matching the entry signature of the object to the exit signature of the object, in order to find out how long people spend in retail stores.

The modeling and analysis of activity of interest can be used as the exemplary way to detect predefined events.

U.S. Pat. Appl. Pub. No. 2002/0085092 of Choi, et al. (hereinafter Choi) disclosed a method for modeling an activity of a human body using optical flow vector from a video and probability distribution of the feature vectors from the optical flow vector. Choi modeled a plurality of states using the probability distribution of the feature vectors and expressed the activity based on the state transition.

Other Application Areas

There have been earlier attempts for activity analysis in various other areas than understanding customers' shopping behaviors, such as the surveillance and security applications. The following prior arts are not restricted to the application area for understanding customers' shopping behaviors in a physical space, but they disclosed methods for object activity modeling and analysis for the human body, using a video, in general.

Surveillance Application

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction. In Pavlidis, the term "object" included customers, and Pavlidis also included itinerary statistics of customers in a department store. However, Pavlidis was primarily related to monitoring a search area for surveillance.

U.S. Pat. Appl. Pub. No. 2004/0113933 of Guler disclosed a method for automatic detection of split and merge events from video streams in a surveillance environment. Guler considered split and merge behaviors as key common simple behavior components in order to analyze high level activities of interest in a surveillance application, which are also used to understand the relationships among multiple objects not just individual behavior. Guler used adaptive background subtraction to detect the objects in a video scene, and the objects were tracked to identify the split and merge behaviors. To understand the split and merge behavior-based high level events, Guler used a Hidden Markov Model (HMM).

U.S. Pat. Appl. Pub. No. 2004/0120581 of Ozer, et al. (hereinafter Ozer) disclosed a method for identifying activity of customers for a marketing purpose or activity of objects in a surveillance area, by comparing the detected objects with the graphs from a database. Ozer tracked the movement of different object parts and combined them to high-level activity semantics, using several Hidden Markov Models (HMMs) and a distance classifier.

Transaction Application

U.S. Pat. No. 6,741,973 of Dove, et al. (hereinafter Dove) disclosed a model of generating customer behavior in a transaction environment. Although Dove disclosed video cameras in a real bank branch as a way to observe the human behavior, Dove are clearly foreign to the concept of automatic event detection based on the customers' behaviors on visual information of the customers in other types of physical space, such as the shopping path tracking and analysis in a retail environment, for the sake of annotating the customers' behaviors.

Computer vision algorithms have been shown to be an effective means for detecting and tracking people. These algorithms also have been shown to be effective in analyzing the behavior of people in the view of the means for capturing images. This allows the possibility of connecting the visual information from a scene to the behavior analysis of customers and predefined event detection.

Therefore, it is an objective of the present invention to provide a novel approach for annotating the customers' behaviors utilizing the information from the automatic behavior analysis of customers and predefined event detection. Any reliable automatic behavior analysis in the prior art may be used for the predefined event detection in the present invention. However, it is another objective of the present invention to provide a novel solution that solves the aforementioned problems found in the prior arts for the automatic event detection, such as the cumbersome attachment of devices to the customers, by automatically and unobtrusively analyzing the customers' behaviors without involving any hassle of requiring the customers to carry any cumbersome device.

Demographics

Computer vision algorithms have been shown to be an effective means for analyzing the demographic information of people in the view of the means for capturing images. Thus, there have been prior attempts for recognizing the demographic category of a person by processing the facial image using various approaches in the computer vision technologies, such as a machine learning approach.

U.S. Pat. No. 6,990,217 of Moghaddam, et al. (hereinafter Moghaddam) disclosed a method to employ Support Vector Machine to classify images of faces according to gender by training the images, including images of male and female faces; determining a plurality of support vectors from the training images for identifying a hyperplane for the gender decision; and reducing the resolution of the training images and the test image by sub-sampling before supplying the images to the Support Vector Machine.

U.S. Pat. Appl. Pub. No. 20030110038 of Sharma, et al. (hereinafter Sharma 20030110038) disclosed a computer software system for multi-modal human gender classification, comprising: a first-mode classifier classifying first-mode data pertaining to male and female subjects according to gender, and rendering a first-mode gender-decision for each male and female subject; a second-mode classifier classifying second-mode data pertaining to male and female subjects according to gender, and rendering a second-mode gender-decision for each male and female subject; and a fusion classifier integrating the individual gender decisions obtained from said first-mode classifier and said second-mode classifier, and outputting a joint gender decision for each of said male and female subjects.

Moghaddam and Sharma 20030110038, for demographics classification mentioned above, aim to classify a certain class of demographics profile, such as for gender only, based on the image signature of faces. U.S. Provisional Pat. No. 60/808, 283 of Sharma, et al. (hereinafter Sharma 60/808,283) is a much more comprehensive solution, where the automated system captures video frames, detects customer faces in the frames, tracks the faces individually, corrects the pose the faces, and finally classifies the demographics profiles of the customers—both of the gender and the ethnicity. In Sharma 60/808,283, the face tracking algorithm has been designed and tuned to improve the classification accuracy; the facial geometry correction step improves both the tracking and the individual face classification accuracy, and the tracking further improves the accuracy of the classification of gender and ethnicity over the course of visibly tracked faces by combining the individual face classification scores.

Therefore, it is another objective of the present invention to detect the predefined events based on the demographic information of people in another exemplary embodiment. The invention automatically and unobtrusively analyzes the customers' demographic information without involving any hassle to customers or operators of feeding the information manually, utilizing the novel demographic analysis approaches in the prior arts.

The present invention utilizes the event detection by the automatic behavior analysis and demographic analysis in a first video stream to synchronize the same event in another second video stream and allows an annotator to annotate the synchronized event through an annotation tool. The manual annotation data in the present invention can be used for various market analysis applications, such as measuring deeper insights for customers' shopping behavior analysis in a retail store, media effectiveness measurement, and traffic analysis.

SUMMARY

The present invention is a method and system for optimizing the observation and annotation of predefined events by enabling the automatic detection of predefined events based on the behavior of people in a first video stream from a first means for capturing images in a physical space and the annotation for each of the events by an annotator utilizing an annotation tool.

It is an objective of the present invention to efficiently handle complex human behavior from video sources utilizing a plurality of computer vision technologies, such as person detection and tracking, and the annotation tool in a preferred embodiment. The present invention captures a plurality of input images of the persons by a plurality of first means for capturing images and processes the plurality of input images in order to detect the predefined events based on the behavior analysis of the people in an exemplary embodiment. Utilization of the dwell time of the people in a specific location of the physical space can be used as one of the exemplary criteria for defining the targeted behavior. Examples of the temporal targeted behavior can comprise passerby behavior and engaged shopper behavior based on the dwell time measurement and comparison against predefined thresholds.

The processes are based on a novel usage of a plurality of computer vision technologies to analyze the human behavior from the plurality of input images. The method leverages the strengths of the technologies in the present invention and processes to deliver a new level of access to the behaviors and visual characteristics of people in the physical space.

Although automatic behavior analysis of people is the primary method for the predefined event detection in the present invention, the automatic event detection in the present invention can also be triggered by the other visual characteristics and segmentation of people in the physical space, such as the demographics, in another exemplary embodiment. Therefore, it is another objective of the present invention to process the first video stream in order to detect demographics of the people in the field of view of the first means for capturing images automatically and generate time-stamped lists of events based on the automatically detected demographics of the people for the predefined event detection.

An exemplary embodiment of the present invention can be applied to a retail space application, and it can provide demographic segmentation of the shoppers by gender and age group in this particular application domain. In this exemplary embodiment, the shopping behavior of each demographic group can be analyzed to obtain segment-specific insights. Understanding segment-based shopper behavior for a specific business goal in the retail space can help to develop effective customer-centric strategies to increase the basket size and loyalty of the highest-opportunity segments.

The present invention utilizes a plurality of first means for capturing images and a plurality of second means for capturing images in a preferred embodiment. The first means for capturing images can be an overhead top-down camera, and the second means for capturing images can be a camera that is positioned to observe the people more closely for analyzing a specific event.

In another embodiment, the present invention can also utilize different types of sensors for the automatic event detection. For example, the present invention can utilize a wireless sensor based tracking for the automatic event detection or a door sensor to trigger an event. Examples of the wireless sensor can include, but are not limited to, a RFID and means for using the RFID.

The present invention generates time-stamped lists of events based on the automatically detected predefined events. Then, it can access a synchronized second video stream from a second means for capturing images that are positioned to observe the people more closely using the timestamps associated with the detected events from the first video stream. Using the timestamps and the time-stamped lists of events, the present invention can access the corresponding sub-streams for the events in the synchronized second video stream.

It is another objective of the present invention that the utilization of the automatic event detection and the synchronization efficiently help the annotation process by reducing the amount of video streams and the time to handle and by allowing the annotator to focus more on the interested events according to the predefined rules for the automatically detected events. A time-server can be used in order to maintain a synchronized time in the network of means for control and processing in the present invention.

The present invention can enable an annotator to manually annotate each of the synchronized events in the corresponding sub-streams for the events in the synchronized second video stream, with a plurality of labels, using a tool.

The annotation tool can comprise a user interface for the annotation. Examples of the user interface can comprise a digital annotation tool or an analog annotation tool. The user interface allows users to mark time-based annotations describing more complex behavioral issues, which may not be detected by using a fully automated method and require human identification. Examples of the more complex behavioral issues can comprise expressions of the people.

The tool can further comprise a graphical user interface for the annotation to further make the analysis more efficient. The graphical user interface can be used to browse the video streams based on the timestamps of the events, such as the beginning and end time.

The physical space may be a retail space, and the people may be customers or shoppers in the retail space in the description of the invention. In an exemplary embodiment for a retail space, the solution in the present invention can help the owner of the particular embodiment to have in-depth understanding of shopper behavior. The annotation can be utilized for more quantitative and deeper behavior analysis about the interaction of people with commercial products in the retail space. The present invention can also generate statistical reports by aggregating the annotated events.

However, although the disclosed method may be described in the context of a retail space, the present invention can be applied to any physical space, and the application area of the present invention is not limited to the retail space.

In another exemplary embodiment, the present invention can utilize a rule-based logic module for the synchronization between the first video stream and the second video stream.

This enables dynamic rule application, where the synchronization can be adjusted based on the rules defined in the module, rather than the synchronization relying on an ad-hoc solution or static hard-code.

DRAWINGS

Figures

FIG. 1 is an overview of a preferred embodiment of the invention, where the present invention detects predefined events in a first video stream from a top-down first means for capturing images and generates time-stamped lists of events, which are used to access the corresponding sub-streams for the events in a synchronized second video stream from a second means for capturing images for the annotation of the events.

Figure 5:
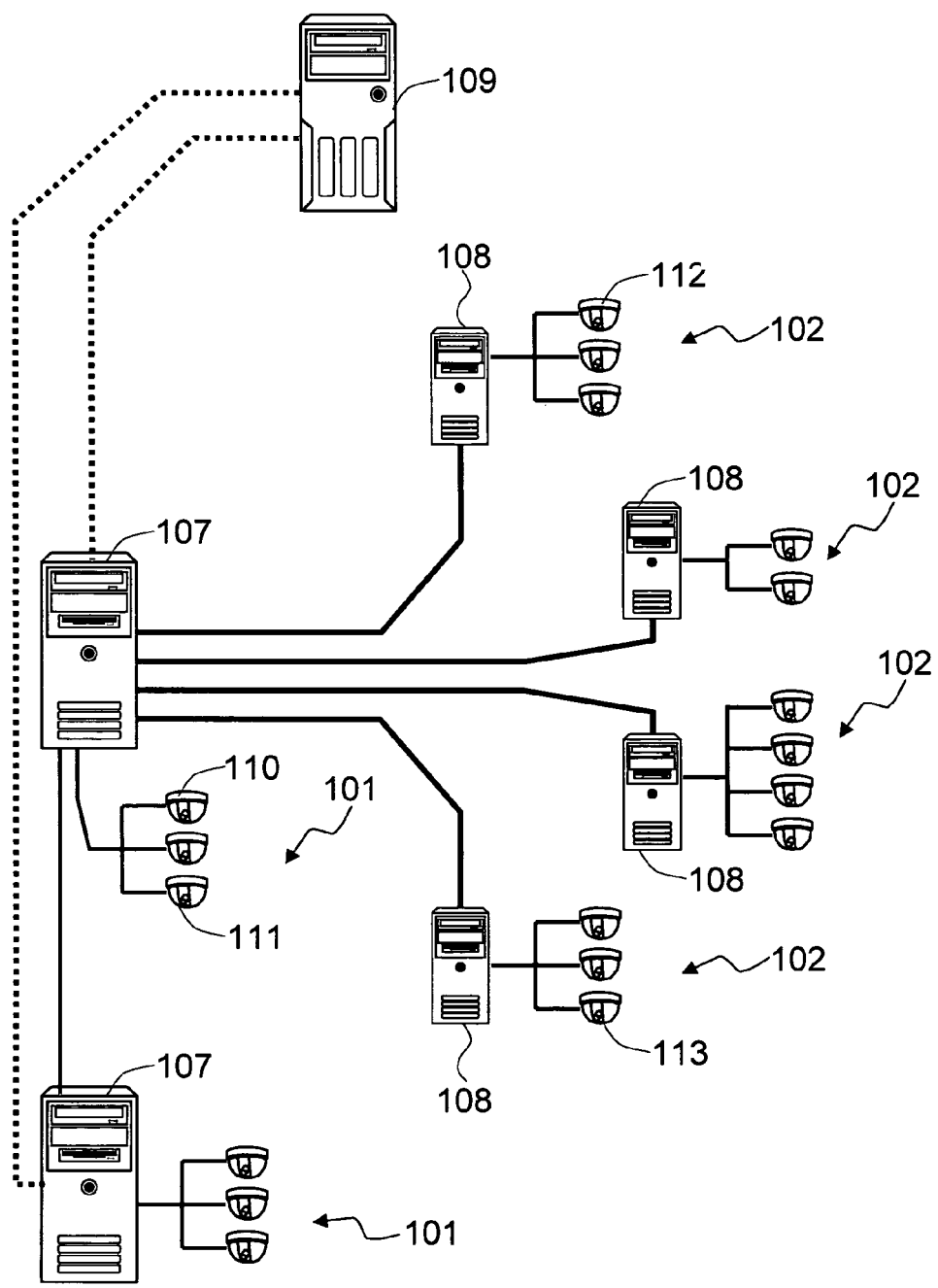

FIG. 5 shows an exemplary synchronization architecture in an exemplary network of a plurality of means for control and processing in the present invention, where the network consists of a plurality of first means for control and processing and a plurality of second means for control and processing, which communicate with each other to synchronize the time-stamped lists of events among a plurality of video streams for the detected events.

Figure 6:
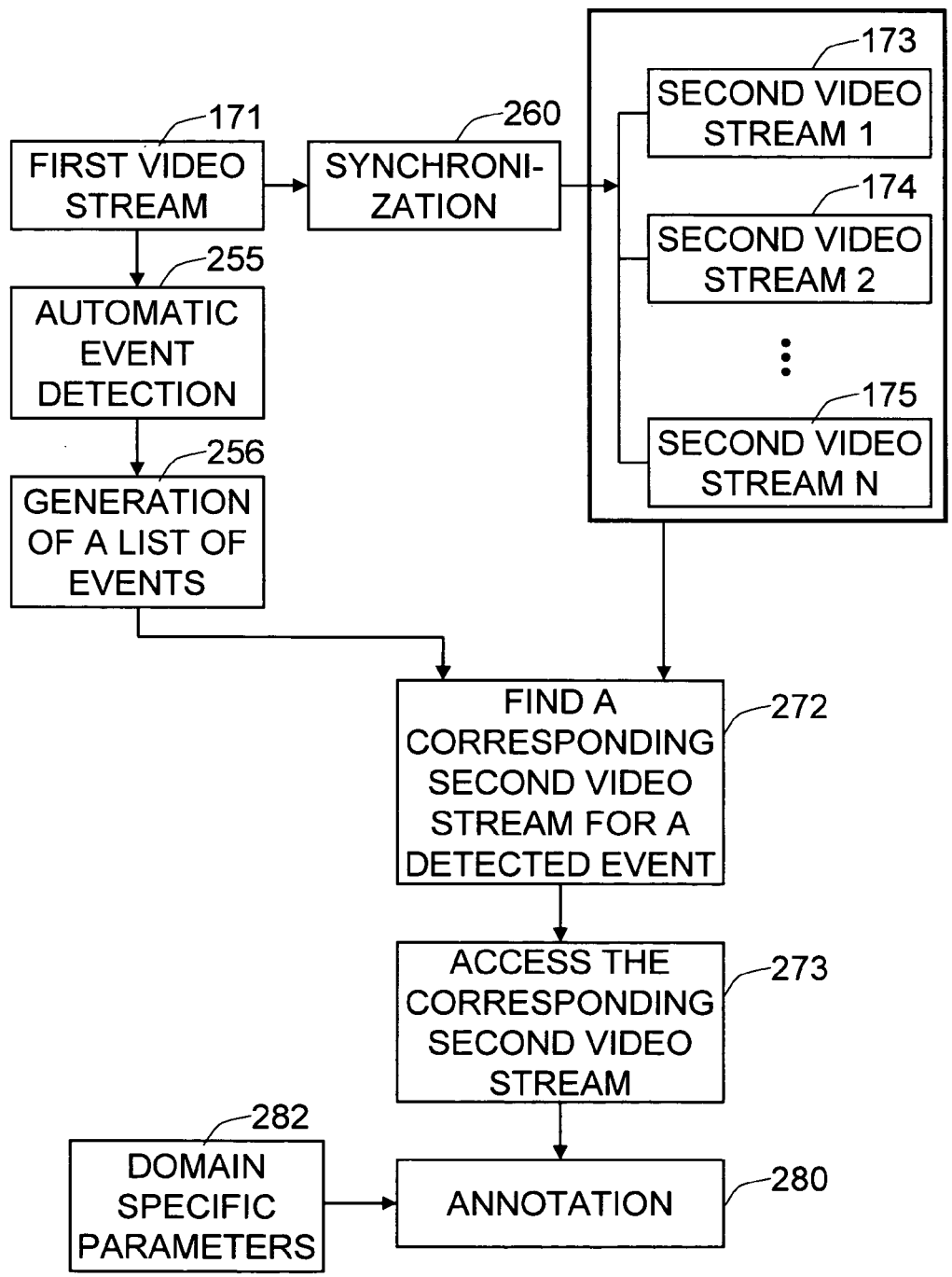

FIG. 6 shows overall processes of an exemplary embodiment of the present invention, comprising the automatic event detection in a first video stream, the synchronization of the event in a corresponding second video stream, and the annotation of the detected event in the synchronized second video stream.

Figure 7:
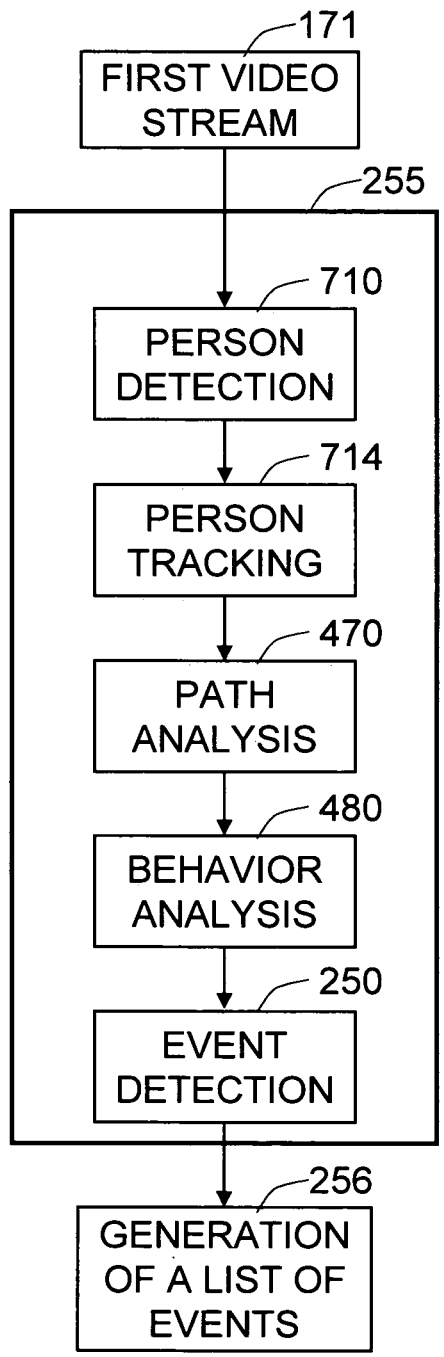

FIG. 7 shows detailed exemplary processes of predefined event detection, based on the behavior analysis of the people, in an exemplary automatic event detection module in the present invention.

Figure 8:
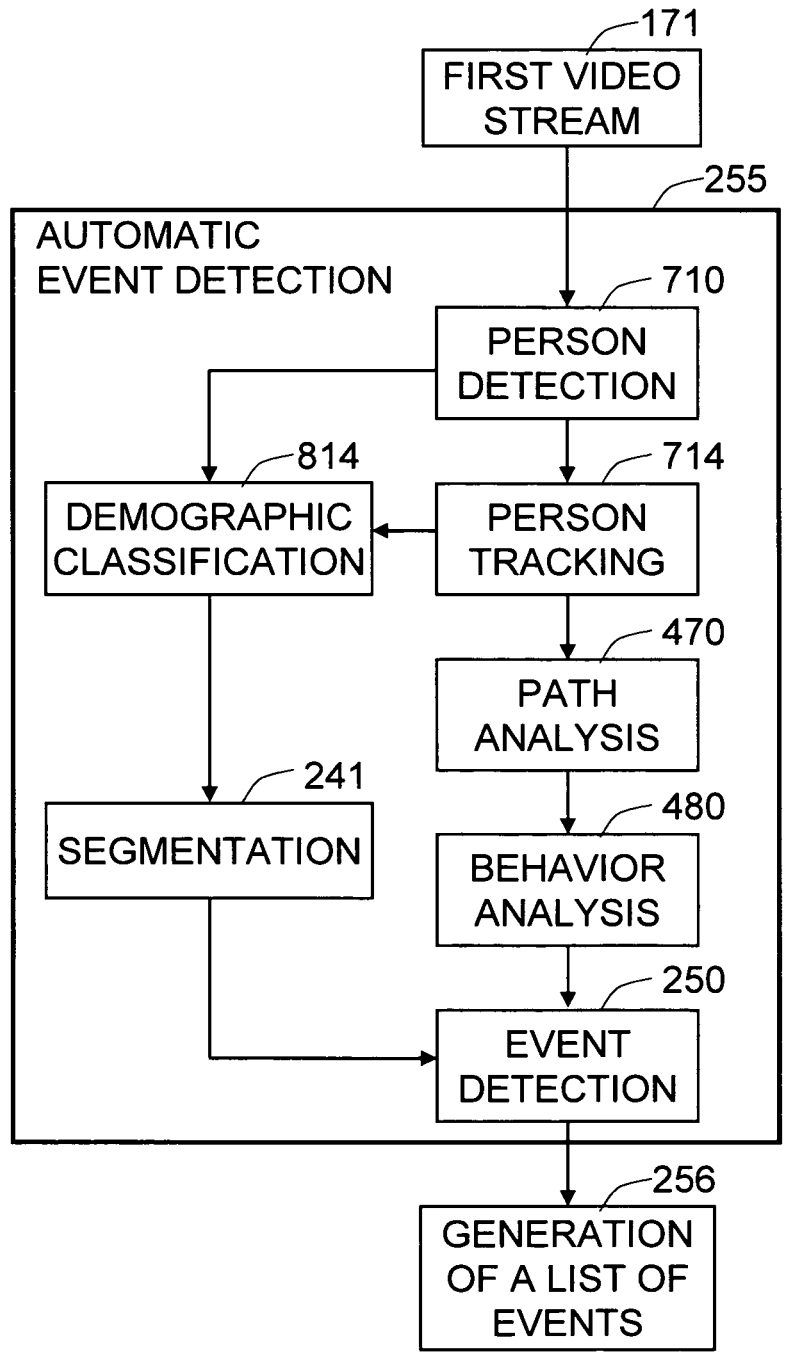

FIG. 8 shows detailed exemplary processes of automatic detection of predefined events in another exemplary embodiment of the present invention, where the predefined event detection also uses the segmentation information of the people, such as demographics, in an exemplary automatic event detection module.

DETAILED DESCRIPTION OF THE INVENTION

Figure 1:
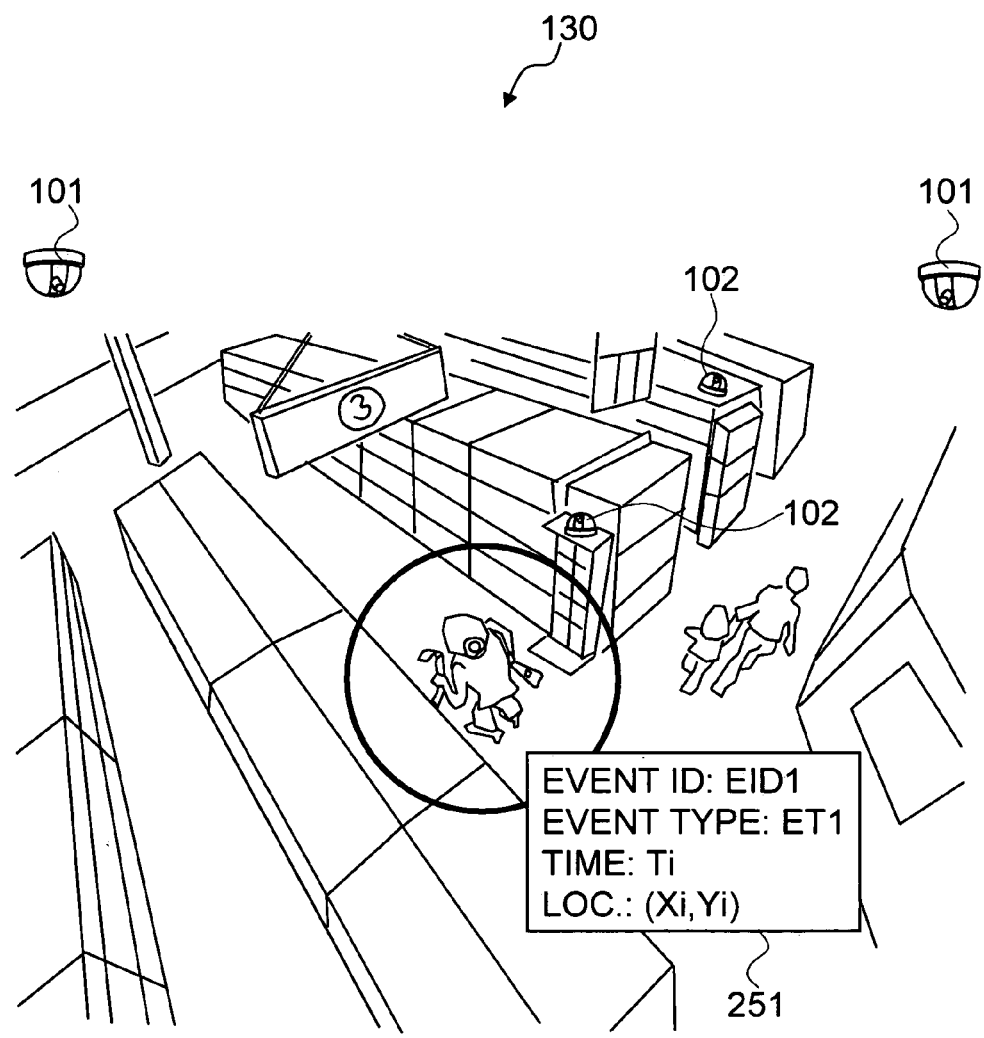

FIG. 1 is an overview of a preferred embodiment of the invention, where the present invention detects predefined events in a first video stream from a top-down first means for capturing images 101 and generates time-stamped lists of events, which are used to access the corresponding sub-streams for the events in a synchronized second video stream from a second means for capturing images 102 for the annotation of the events.

The processes in the present invention are based on a novel usage of a plurality of computer vision technologies to analyze the human behavior from the plurality of input images. The method leverages the strengths of the technologies in the present invention and processes to deliver a new level of access to the behaviors and visual characteristics of people in the physical space.

In the exemplary embodiment shown in FIG. 1, the present invention captures a plurality of input images of the people in a physical space 130 by a plurality of first means for capturing images 101 and processes the plurality of input images in order to detect the predefined events based on the behavior analysis of the people in the physical space.

The behavior analysis and the following automatic event detection can be based on the spatial and temporal attributes of the person tracking in the field of view of a first means for capturing images 101. For example, when a person stays in a specific region of interest in the physical space for more than a predefined time threshold, it can be decided that an event occurred. In the exemplary embodiment shown in FIG. 1, an exemplary "event detection 1" 251 can comprise the automatically measured spatial and temporal attributes about the detected event, such as the time "Ti" when the event occurred and the location "(Xi, Yi)" of the event, the assigned event identification "EID1", and the event type "ET1" of the specific event.

As said, the utilization of the dwell time of the people in a specific location of the physical space can be used as one of the criteria for defining the targeted behavior. Examples of the temporal targeted behavior can comprise passerby behavior and engaged shopper behavior, based on the dwell time measurement and comparison against predefined thresholds.

As shown in the exemplary embodiment in FIG. 1, the present invention can utilize a plurality of first means for capturing images 101 and a plurality of second means for capturing images 102 in a preferred embodiment. The first means for capturing images 101 can be an overhead top-down camera, and the second means for capturing images 102 can be a camera that is positioned to observe the people more closely for analyzing a specific event.

The present invention generates time-stamped lists of events based on the automatically detected predefined events. Then, it can access a synchronized second video stream from a second means for capturing images 102 that is positioned to observe the people more closely, using the timestamps associated with the detected events from the first video stream. Using the timestamps and the time-stamped lists of events, the present invention can access the corresponding sub-streams for the events in the synchronized second video stream.

The physical space may be a retail space, and the people may be customers or shoppers in the retail space in the description of the invention. In an exemplary embodiment for a retail space, the solution in the present invention can help the owner of the particular embodiment to have an in-depth understanding of shopper behavior. The annotation can be utilized for more quantitative and deeper behavior analysis about the interaction of people with commercial products in the retail space. The present invention can also generate statistical reports by aggregating the annotated events.

However, although the disclosed method may be described in the context of a retail space, the present invention can be applied to any physical space, and the application area of the present invention is not limited to the retail space.

Figure 2:
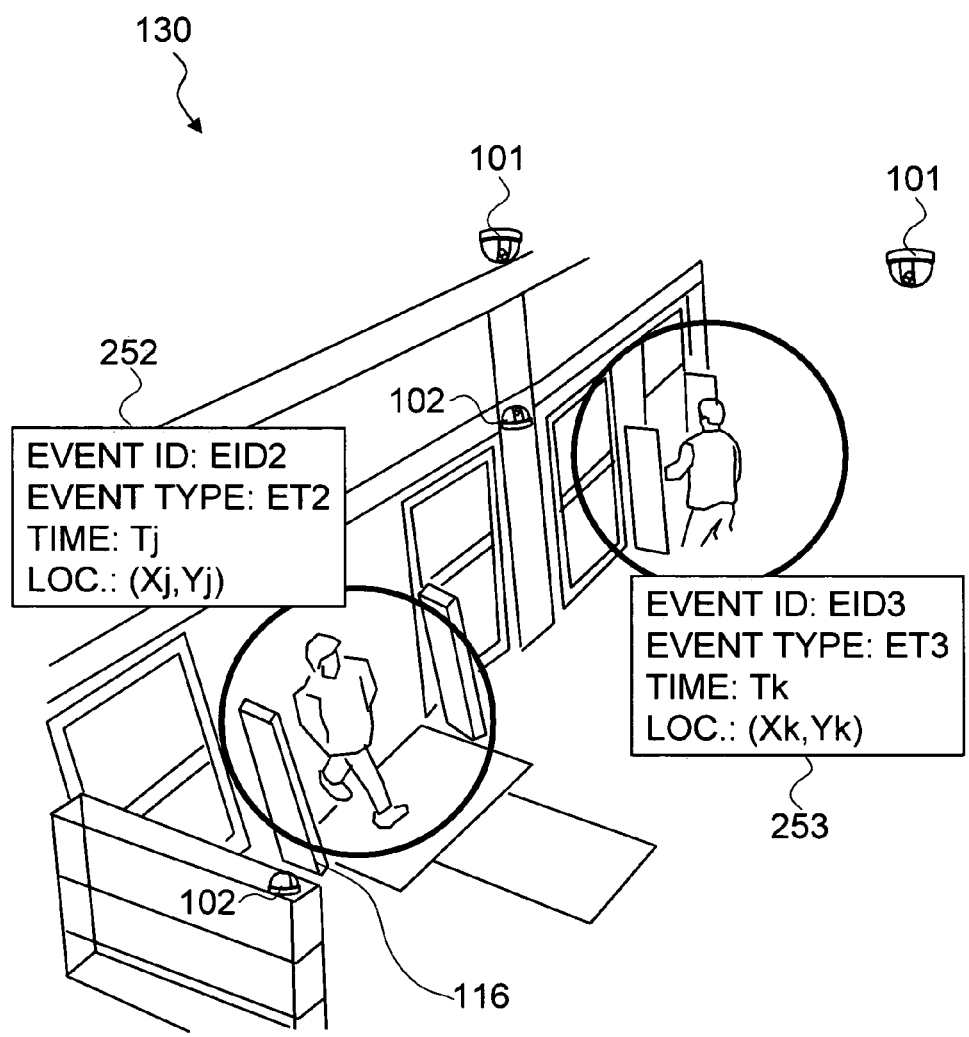
FIG. 2 is an overview of another exemplary embodiment of the invention, where the present invention uses a different type of sensor for detecting the predefined events.

FIG. 2 is an overview of another exemplary embodiment of the invention, where the present invention uses a different type of sensor for detecting the predefined events.

In an exemplary embodiment, the automatic behavior analysis of people is the preferred method for detecting the predefined event in the present invention. However, the automatic event detection can also be triggered by the other visual characteristics and segmentation of people in the physical space, such as the demographics, in another exemplary embodiment. In this exemplary embodiment, the present invention can process the first video stream in order to detect the demographics of the people in the field of view of the first means for capturing images automatically and generate time-stamped lists of events based on the automatically detected demographics of the people for the predefined event detection.

In the exemplary embodiment shown in FIG. 2, the present invention can measure the demographics of the people at a specific region of interest, such as the entrance and exit of a physical space 130 using a plurality of first means for capturing images 101. In the exemplary embodiment, an exemplary "event detection 2" 252 can comprise the automatically measured spatial and temporal attributes about the detected event, such as the time "Tj" when the event occurred and the location "(Xj, Yj)" of the event, the assigned event identification "EID2", and the event type "ET2" of the specific event. Likewise, another exemplary "event detection 3" 253 can comprise the automatically measured spatial and temporal attributes about the detected event, such as the time "Tk" when the event occurred and the location "(Xk, Yk)" of the event, the assigned event identification "EID3", and the event type "ET3" of the specific event. In these exemplary event detections, the event types can be defined in association with the automatic demographic measurement, respectively.

In an exemplary embodiment applied to a retail space, the present invention can provide demographic segmentation of the shoppers by gender and age group in this particular application domain. In this exemplary embodiment, the shopping behavior of each demographic group can be analyzed to obtain segment-specific insights. Understanding segment-based shopper behavior for a specific business goal in the retail space can help to develop effective customer-centric strategies to increase the basket size and loyalty of the highest-opportunity segments.

As shown in FIG. 2, the present invention can utilize a plurality of first means for capturing images 101 and a plurality of second means for capturing images 102 in a preferred embodiment. The first means for capturing images 101 can be an overhead top-down camera, and the second means for capturing images 102 can be a camera that is positioned to observe the people more closely for analyzing a specific event.

However, in the exemplary embodiment, the present invention can also utilize different types of sensors for a different type of automatic event detection, such as a wireless sensor, a door sensor 116, or other types of sensors in an electronic article surveillance (EAS) system. Examples of the wireless sensor can include, but are not limited to, a RFID and means for using the RFID. A sequence of the RFID proximity detection can be used to provide tracking information of the people. In the exemplary embodiment shown in FIG. 2, the present invention can use a door sensor 116 to trigger a different type of event, such as an anti-theft alarm event.

Figure 3:
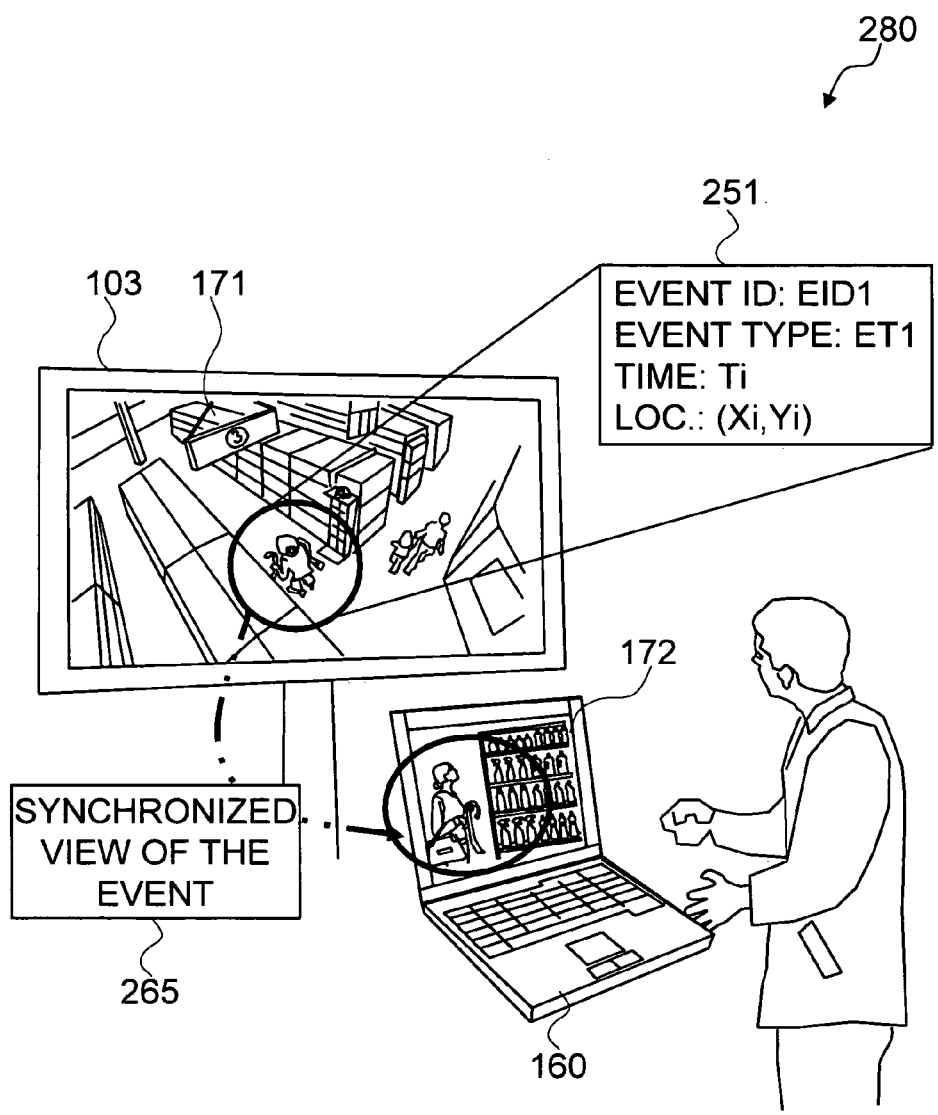
FIG. 3 shows an exemplary scene of the annotation process by an annotator for the synchronized view of the events, using an exemplary annotation tool.

FIG. 3 shows an exemplary scene of the annotation 280 process by an annotator for the synchronized view of the events using an exemplary annotation tool 160.

The present invention can enable an annotator to manually annotate each of the synchronized events in the corresponding sub-streams for the events in the synchronized second video stream 172, with a plurality of labels, using an annotation tool 160.

The annotation tool 160 can comprise a user interface for the annotation. Examples of the user interface can comprise a digital annotation tool or an analog annotation tool. The user interface allows users to mark time-based annotations describing more complex behavioral issues, which may not be detected by using a fully automated method and require human identification. Examples of the more complex behavioral issues can comprise expressions of the people.

In the exemplary embodiment shown in FIG. 3, the present invention detects an exemplary event, "event detection 1" 251, in a first video stream 171, and then the annotator can use the annotation tool 160 to find the corresponding synchronized event in a second video stream 172, utilizing the attributes in the exemplary "event detection 1" 251. The annotator can also use the annotation tool 160 to watch and annotate the synchronized event in a second video stream 172 by accessing the synchronized view of the event 265 in the annotation tool 160. The present invention can also display the top-down event detection view from the first video stream 171 on a means for playing output 103.

Figure 4:
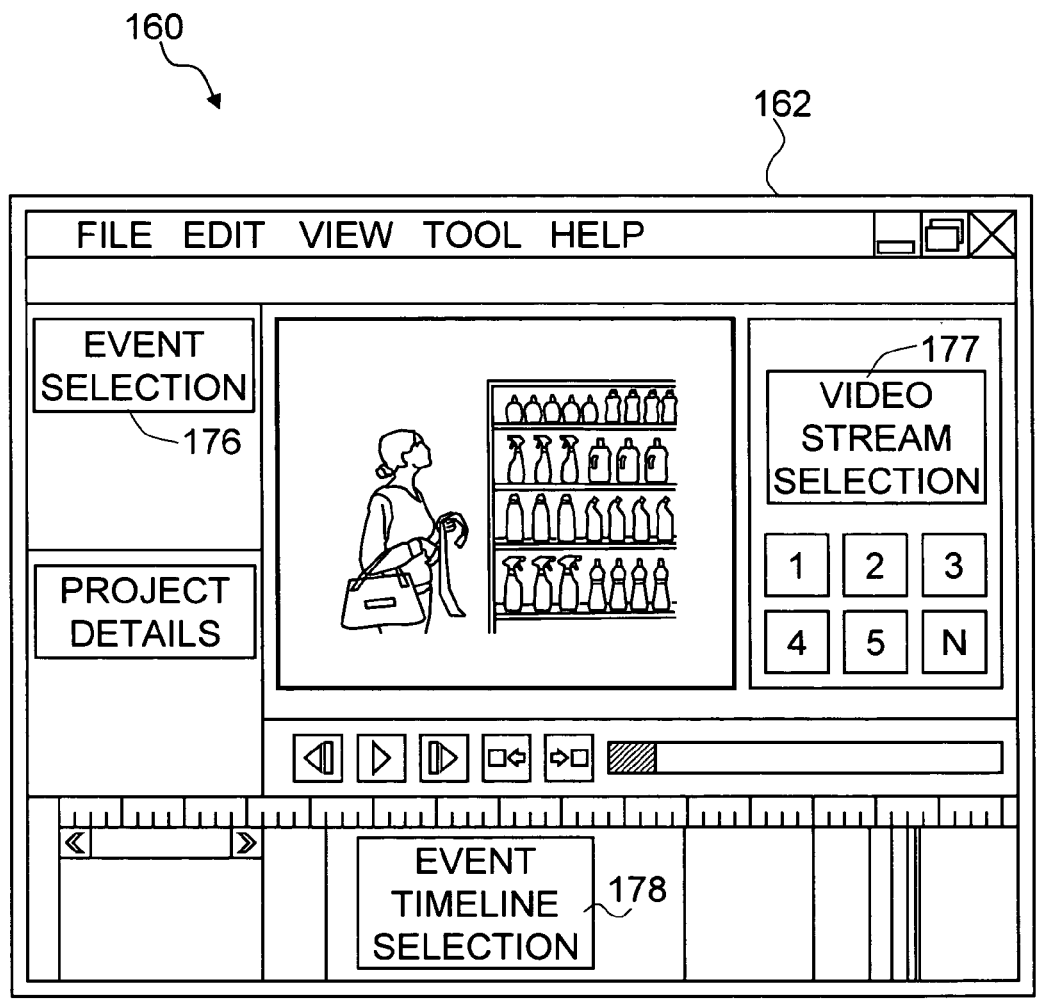
FIG. 4 shows an exemplary annotation tool in the present invention.

FIG. 4 shows an exemplary annotation tool 160 in the present invention.

The annotation tool 160 can further comprise a graphical user interface 162 for the annotation to further make the analysis more efficient as shown in FIG. 4. The graphical user interface 162 can be used to browse the video streams based on the timestamps of the events, such as the beginning and end time.

In the exemplary embodiment shown in FIG. 4, the exemplary graphical user interface 162 can comprise event selection 176, video stream selection 177, event timeline selection 178, and other facilitating interface capabilities. Using the event selection 176, the annotator can browse through time-stamped lists of events, automatically generated by the present invention, and select a synchronized second video stream among a plurality of available second video streams, using the video stream selection 177. After a second video stream, relevant to the target event for annotation, is selected, the annotator can quickly and efficiently access the corresponding sub-streams for the event in the synchronized second video stream, using the timestamps for the detected events.

FIG. 5 shows an exemplary synchronization architecture in an exemplary network of a plurality of means for control and processing in the present invention, where the network consists of a plurality of first means for control and processing 107 and a plurality of second means for control and processing 108, which communicate with each other to synchronize the time-stamped lists of events among a plurality of video streams for the detected events.

The present invention generates time-stamped lists of events based on the automatically detected predefined events. Then, it can access a synchronized second video stream from a second means for capturing images that are positioned to observe the people more closely, using the timestamps associated with the detected events from the first video stream. Using the timestamps and the time-stamped lists of events, the present invention can access the corresponding sub-streams for the events in the synchronized second video stream.

The utilization of the automatic event detection and the synchronization efficiently help the annotation process by reducing the amount of video streams and the time to handle and by allowing the annotator to focus more on the interested events according to the predefined rules for the automatically detected events.

A time-server 109 can be used in order to maintain a synchronized time in the network of means for control and processing in the present invention.

In the exemplary embodiment shown in FIG. 5, the exemplary network of a plurality of means for control and processing can consist of a plurality of first means for control and processing 107 and a plurality of second means for control and processing 108. In this exemplary embodiment, a first means for control and processing 107 can act as a server and a plurality of second means for control and processing 108 can act as clients. The server can run its own local clock or be connected to a global time-server 109 for the synchronization utilizing a time synchronization protocol, such as the Network Time Protocol (NTP).

The number of means for capturing images per a means for control and processing varies, depending on the system configuration in the physical space. However, each means for control and processing knows the location and the identification of each of its associated plurality of means for capturing images and the area covered by the means for capturing images. Therefore, when an event is detected by a top-down first means for capturing images 101 at a location, its associated first means for control and processing 107 can correctly find the corresponding second means for capturing images 102 close to the specific location, through communicating with the second means for control and processing, associated with the corresponding second means for capturing images 102.

In the exemplary embodiment shown in FIG. 5, when an event is detected by the "first means for capturing images at location L1" 110, the present invention can correctly find the corresponding event and sub-streams from the "second means for capturing images at location L1" 112. Likewise, the present invention can correlate the events between the "first means for capturing images at location Ln" 111 and the "second means for capturing images at location Ln" 113 for the location Ln, using their location and identification information.

In another exemplary embodiment, the present invention can utilize a rule-based logic module for the synchronization among a plurality of the first video streams and a plurality of the second video streams. For example, when there are multiple second means for capturing images in the vicinity of a single detected event, the annotator can select and utilize any of the plurality of the second video streams from their associated second means for capturing images. However, the rule-based logic module can also further help the annotator by providing more information about the detected event and synchronization, based on the predefined rules in the module. For example, the logic module can provide priority information among the plurality of second video streams according to the predefined rules for the order, relevance, and specific needs at the specific location in the physical space.

The rule-based logic module can also enable a dynamic rule application, where the synchronization can be adjusted dynamically based on the rules defined in the module, rather than the synchronization relying on an ad-hoc solution or static hard-code.

FIG. 6 shows overall processes of an exemplary embodiment of the present invention, comprising the automatic event detection 255 in a first video stream 171, the synchronization 260 of the event in a corresponding second video stream, and the annotation 280 of the detected event in the synchronized second video stream.

In the exemplary embodiment shown in FIG. 6, the present invention processes a generation of lists of events 256, based on the "automatic event detection" 255 in a first video stream 171, from a first means for capturing images 101. Then, an annotator can use the information in the generated events, such as the timestamp, the location of the corresponding second means for capturing images and the corresponding second means for control and processing, and their identifications, to find 272 and access 273 a synchronized second video stream, among a plurality of available second video streams, i.e. "second video stream 1" 173, "second video stream 2" 174, and "second video stream N" 175, from the corresponding second means for capturing images that are positioned to observe the people more closely, utilizing an annotation tool.

The annotator further uses the detailed information for the target event, such as the start and end timestamps of the event, to access the relevant sub-streams in the synchronized second video stream for the final annotation 280 of the specific event, based on the domain specific parameters 282.

FIG. 7 shows detailed exemplary processes of predefined event detection based on the behavior analysis of the people in an exemplary "automatic event detection" 255 module in the present invention.

As shown in the particular embodiment in FIG. 7, the present invention detects 710 and tracks 714 a person in a physical space for the path analysis 470, and the information in the path analysis 470, such as the sequence of coordinates and temporal attributes, are used for the behavior analysis 480 of the person.

The present invention can utilize any reliable video-based tracking method for people in the prior art in regards to the behavior analysis.

U.S. Pat. No. 7,974,869 of Sharma, et al. (hereinafter Sharma869) disclosed an exemplary process of video-based tracking and behavior analysis for a single customer or a group of customers using multiple means for capturing images, based on the spatial and temporal attributes of the person tracking.

FIG. 20 and FIG. 21 in Sharma869 show exemplary spatio-temporal primitives for modeling human-object behavior and exemplary shopping interaction levels that are observed to produce the behavioral analysis in a physical space.

As described in Sharma869, the behavior recognition can be achieved via spatio-temporal analysis of tracks, using geometry and pattern recognition techniques. The approach for defining and detecting spatio-temporal relations specific to the retail enterprise domain followed by a Bayesian Belief propagation approach to modeling primitive behaviors specific to the retail domain, as an exemplary site of a media network in Sharma869, can be applied to any physical space.

In Sharma869, the exemplary primitive behaviors comprised categories of "customer moves towards object", "customer doesn't walk towards object", "customer velocity reduces", "customer velocity increases", "customer stands in front of object", and "customer walks away from object", and these primitive behaviors were combined to model predefined complex behaviors. Then the behaviors of the people were analyzed based on the model. Walkthrough history, the time spent in a certain area within a physical space, frequency pattern, relational pattern, and special event pattern can also be used as the exemplary attributes for the behavior analysis.

The exemplary shopping interaction levels in Sharma869 can be regarded as an exemplary higher level of complex behaviors in a target physical space, especially in a retail space, which are observed to produce the behavioral analysis in the context of the present invention.

Sharma869 defined the exemplary shopping interaction levels based on the spatio-temporal relations, which are "passing by", "noticing", "stopping", from "engaging 1" to "engaging P-1", and "purchase". They are labeled as "level 1" interaction, "level 2" interaction, "level 3" interaction, from "level 4" interaction to "level P-1" interaction, and "level p" interaction, respectively, where multiple engaging levels are also considered.

The shopping interaction level can be measured based on the temporal attribute of the person tracking for the customer in regards to the combination of the primitive behaviors. For example, if there is no change in velocity, the present invention can measure the customer's interaction level as a passer-by level at a particular category. If the stopping time T1 is greater than a threshold, such as T1 seconds, then the present invention can measure the customer's interaction level as a level 4 interaction. Likewise, the temporal attribute of the person tracking can match the time value to the corresponding interaction levels, based on the predefined threshold and rules.

Utilizing the exemplary method for behavior analysis based on the spatio-temporal primitives and model for the interaction levels, such as the shopping interaction levels in a retail space, based on the path analysis 470 of the people in a physical space, the present invention can detect 250 the predefined events and generate a list of the detected events 256.

FIG. 8 shows detailed exemplary processes of automatic detection of predefined events in another exemplary embodiment of the present invention, where the predefined event detection also uses the segmentation information of the people, such as demographics, in an exemplary automatic event detection module.

In the exemplary embodiment of the automatic event detection 255 shown in FIG. 8, the present invention can process the event detection 250 based on the behavior analysis of the people in a physical space and generate a list of detected events 256 as described in regards to FIG. 7.

As shown in FIG. 8, the computer vision based automatic segmentation 241 of the people on a video can also be used as one of the criteria to define certain types of events. Automatic demographic classification 814 can be used as an exemplary segmentation of the people.

In the exemplary embodiment shown in FIG. 8, the present invention can process segmentation 241 of the customer, such as the demographic classification 814, based on the images of the people in a first video stream 171 and use the segmentation 241 information to detect the predefined events based on the segmentation criteria.

The present invention can utilize any reliable demographic composition measurement method in the prior art as an exemplary video-based segmentation of the customers. For example, the above-mentioned U.S. Provisional Pat. No. 60/808,283 of Sharma, et al. (Sharma 60/808,283) disclosed an exemplary demographic composition measurement based on gender and ethnicity. Age is also another attribute that Sharma 60/808,283 can measure.

Automatic event detection based on the segmentation of the people in a physical space, such as a retail space, can provide unique benefits to the annotator and the owner of a particular embodiment of the present invention. For example, the detailed annotation labels can be efficiently organized based on the predefined segmentation criteria in the events. Detailed annotation labels per demographic groups can be a very useful market analysis data in an exemplary embodiment of the present invention.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for efficiently annotating behavior and characteristics of a person or a plurality of persons in a first video stream and a second video stream in a physical space, comprising the following steps of:
   a) capturing the first video stream of the person or the plurality of persons by a first means for capturing images,
   b) processing the first video stream in order to track and detect predefined behavior and demographics of the person or the plurality of persons in a field of view of the first means for capturing images automatically using at least a means for control and processing that executes computer vision algorithms on the first video stream,
   c) providing demographic segmentation of the person or the plurality of persons to create a plurality of demographic groups,
   d) analyzing the behavior based on spatio-temporal primitives and a model for interaction levels of the person or the plurality of persons, wherein the behavior of each demographic group is analyzed to obtain segment-specific insights,
   e) generating time-stamped lists of events based on the automatically detected predefined behavior and demographics, using a time server,
   f) using the time-stamped lists of events and timestamps of events in the time-stamped lists of events to access at least a corresponding sub-stream for the events in the second video stream from a second means for capturing images,
   g) manually annotating each of the events with a plurality of labels for a synchronized annotation using a user interface, and
   h) utilizing the annotation for quantitative behavior analysis about interaction of the person or the plurality of persons with a plurality of commercial products in the physical space,
   wherein the first video stream is synchronized with the second video stream, and whereby the user interface allows users to mark time-based annotations describing complex behavioral issues, including expressions of the person or the plurality of persons.

2. The method according to claim 1, wherein the method further comprises a step of utilizing a plurality of first means for capturing images,
   wherein the plurality of first means for capturing images are synchronized with the second means for capturing images by using the time-stamped lists of events and the timestamps of events, and
   whereby the first means for capturing images comprises an overhead top-down camera.

3. The method according to claim 1, wherein the method further comprises a step of utilizing a plurality of second means for capturing images,
   whereby the second means for capturing images comprises a camera that is positioned to observe the person or the plurality of persons more closely for analyzing a specific event.

4. The method according to claim 1, wherein the method further comprises a step of using a graphical user interface for the annotation, whereby the graphical user interface is used to browse the first video stream and the second video stream based on the timestamps of the events, comprising beginning time and end time of the events.

5. The method according to claim 1, wherein the method further comprises a step of utilizing the time-stamped lists of events and the synchronized annotation to reduce time required to analyze a large amount of the first video stream and the second video stream.

6. The method according to claim 1, wherein the method further comprises a step of utilizing dwell time of the person or the plurality of persons to detect the predefined behavior,
whereby the predefined behavior based on the dwell time comprises passerby behavior and engaged shopper behavior.

7. The method according to claim 1, wherein the method further comprises a step of generating statistical reports by aggregating the annotated events.

8. The method according to claim 1, wherein the method further comprises a step of utilizing at least a wireless sensor and a wireless sensor based tracking to track and detect predefined behavior,
whereby the wireless sensor comprises a RFID and means for using the RFID.

9. The method according to claim 1, wherein the method further comprises a step of utilizing door sensors to detect predefined behavior.

10. The method according to claim 1, wherein the method further comprises a step of utilizing a rule-based logic module to synchronize the first video stream with the second video stream,
wherein the synchronization is adjusted dynamically based on rules defined in the rule-based logic module.

11. A system for efficiently annotating behavior and characteristics of a person or a plurality of persons in a first video stream and a second video stream in a physical space, comprising:
a) at least a first means for capturing images that captures the first video stream of the person or the plurality of persons,
b) at least a first means for control and processing that executes computer vision algorithms on the first video stream, performing the following steps of:
processing the first video stream in order to track and detect predefined behavior and demographics of the person or the plurality of persons in a field of view of the first means for capturing images automatically,
providing demographic segmentation of the person or the plurality of persons to create a plurality of demographic groups,
analyzing the behavior based on spatio-temporal primitives and a model for interaction levels of the person or the plurality of persons, wherein the behavior of each demographic group is analyzed to obtain segment-specific insights, and
generating time-stamped lists of events based on the automatically detected predefined behavior and demographics, using a time server, and
c) an annotation tool for using the time-stamped lists of events and timestamps of events in the time-stamped lists of events to access at least a corresponding sub-stream for the events in the second video stream from a second means for capturing images, and
for annotating each of the events with a plurality of labels for a synchronized annotation including a user interface for the annotation,
wherein the first video stream is synchronized with the second video stream,
wherein the annotation is utilized for quantitative behavior analysis about interaction of the person or the plurality of persons with a plurality of commercial products in the physical space, and
whereby the user interface allows users to mark time-based annotations describing complex behavioral issues, including expressions of the person or the plurality of persons.

12. The system according to claim 11, wherein the system further comprises at least an overhead top-down camera that is connected to the first means for control and processing,
wherein the overhead top-down camera is synchronized with the second means for capturing images by using the time-stamped lists of events and the timestamps of events.

13. The system according to claim 11, wherein the system further comprises a plurality of second means for capturing images,
whereby the second means for capturing images comprises a camera that is positioned to observe the person or the plurality of persons more closely for analyzing a specific event.

14. The system according to claim 11, wherein the system further comprises a graphical user interface for the annotation,
whereby the graphical user interface is used to browse the first video stream and the second video stream based on the timestamps of the events, comprising beginning time and end time of the events.

15. The system according to claim 11, wherein the system further comprises a means for control and processing for utilizing the time-stamped lists of events and the synchronized annotation to reduce time required to analyze a large amount of the first video stream and the second video stream.

16. The system according to claim 11, wherein the system further comprises a means for control and processing for utilizing dwell time of the person or the plurality of persons to detect the predefined behavior,
whereby the predefined behavior based on the dwell time comprises passerby behavior and engaged shopper behavior.

17. The system according to claim 11, wherein the system further comprises a means for control and processing for generating statistical reports by aggregating the annotated events.

18. The system according to claim 11, wherein the system further comprises at least a wireless sensor and a means for control and processing that utilizes a wireless sensor based tracking to track and detect predefined behavior,
whereby the wireless sensor comprises a RFID and means for using the RFID.

19. The system according to claim 11, wherein the system further comprises a means for control and processing for utilizing door sensors to detect predefined behavior.

20. The system according to claim 11, wherein the system further comprises a means for control and processing for utilizing a rule-based logic module to synchronize the first video stream with the second video stream, wherein the synchronization is adjusted dynamically based on rules defined in the rule-based logic module.

* * * * *